Jan. 27, 1959 A. BROSH 2,871,419

VARIABLE TIME DELAY CIRCUIT

Filed May 27, 1955 2 Sheets-Sheet 1

INVENTOR.
AMNON BROSH

BY Edward M. Farrell

ATTORNEY

Jan. 27, 1959 A. BROSH 2,871,419

VARIABLE TIME DELAY CIRCUIT

Filed May 27, 1955

2 Sheets-Sheet 2

INVENTOR.
AMNON BROSH
BY
Edward M. Farrell
ATTORNEY

United States Patent Office 2,871,419

Patented Jan. 27, 1959

2,871,419

VARIABLE TIME DELAY CIRCUIT

Amnon Brosh, Philadelphia, Pa., assignor to Tele-Dynamics Inc., a corporation of Pennsylvania Application May 27, 1955, Serial No. 511,663

8 Claims. (Cl. 317—142)

This invention relates to time delay circuits, and more particularly to time delay circuits in which the delay introduced may be variable.

In various electrical systems, it is often necessary to introduce a time delay. In many instances, it is desirable to introduce a variable time delay with the amount of time delay varying in accordance with the level of a voltage, such as a signal voltage received by a radio receiver.

In a communication system, such as the one described in copending application Ser. No. 509,215 of Amnon Brosh, filed May 18, 1955 and assigned to the same assignee as the present invention, for example, carrier operated relays are often employed in mobile relay base stations. Such relays are adapted to be operated by a V. H. F. carrier received by a base station receiver. In systems which utilize a plurality of base stations for relaying signal information, actuation of a carrier operated relay in an originating base station, which may receive signal information from a mobile station, may perform numerous functions. For example, the carrier operated relay may be associated with circuitry in which operation of the relay effectively keys a local V. H. F. transmitter of the base station in which the V. H. F. signal is received. Operation of the relay is also effective in keying a device or electrical circuit which results in the transmission of a control signal from the originating base station to other base stations in the system whereby V. H. F. transmitters of the other base stations are keyed and their V. H. F. receivers are locked out. The locking out of the V. H. F. receivers in the other base stations is provided in order to eliminate the possibility of the V. H. F. signal, from a mobile station for example, feeding two or more base stations within the system at the same time.

Many present carrier operated relays are energized by the reduction of the noise output from a V. H. F. receiver. FM receivers, used in most present systems, have high noise outputs when no carrier signal is being received. This noise may be rectified, amplified and then fed to the carrier operated relay to maintain the relay non-operative, or unactuated. When a carrier signal is received by the V. H. F. receiver of one of the base stations, the noise output from the receiver is correspondingly reduced. A reduction of the rectified noise results and permits operation of the carrier operated relay. Most present carrier operated relays are designed so that a pre-set minimum noise reduction or any value greater than such a minimum reduction operates the relay instantaneously.

In such communication systems having a plurality of base systems, the associated carrier operated relays are adjusted to operate for a value of voltage or current above a certain predetermined minimum. In considering a situation in which a mobile station, such as a touring police car, originates a transmission which is received smultaneously by two base stations, one of the stations may receive the transmission or signal voltage which is slightly above the minimum value necessary to operate the carrier operated relay. In this case, the received signal voltage will include a certain amount of noise. The second station may receive strong and clear signal also above the minimum, which is relatively free of noise. Under these circumstances, the carrier operated relays in both stations will start to operate simultaneously. If the relay in the first station has a slight mechanical advantage, such as closer spacing of contacts, its relay will operate first and the first base station will maintain control of the system and will transmit a control signal which is effective to lock out the receiver in the second base station which is capable of receiving a stronger signal than the first base station. Transmission and control by a base station receiving a weaker signal, results in a noisier signal being transmitted to other base stations within the system.

It is seen that if a time delay means is interposed after an output circuit of a receiver prior to the carrier operated relay that the relay will not be operated instantaneously. If the time delay introduced is made inversely proportional to the strength of the signal received, the relay associated with the station receiving the stronger signal will tend to be actuated prior to the relay associated with a station receiving the weaker signal. When such time delay is employed, which is variable and dependent upon signal strength, it is seen that the base station receiving the strongest signal will have its carrier operated relay operate first and will, therefore, maintain control over other base stations within the system.

While the present invention will be described in connection with a communication system involving a plurality of base stations, it is recognized that the invention may be applicable to numerous other types of systems wherein it is desirable to use time delay circuits.

It is an object of this invention to provide a novel time delay circuit.

It is a further object of this invention to provide an improved time delay circuit to delay the operation of a control device in accordance with the level of a signal voltage.

It is still a further object of this invention to provide an improved variable time delay circuit in which the time delay introduced is inversely proportional to the strength of a signal voltage.

In accordance with the present invention, a time delay circuit includes a source of reference voltage which is variable with its value being dependent upon the voltage level of an incoming signal. A step-up voltage of a relatively fixed level is provided when the incoming signal reaches a predetermined value. The reference voltage and the step-up voltage are applied to an input circuit to operate a control device. The control device is adapted to be actuated by a voltage of a predetermined level. The step-up voltage level may be higher than the reference voltage level. The reference potential is applied to the input circuit through a capacitor which provides a relatively low impedence path for the step-up voltage at the first instance of application of the step-up voltage to the input circuit. The impedence path increases as the capacitor charges towards the step-up voltage. The voltage across the capacitor reaches the level at which the control device is actuated after a time delay which is dependent upon the level of the reference voltage.

Other objects and advantages of the present invention will be apparent and suggest themselves to those skilled in the art to which the invention pertains, from a reading of the following specifications in connection with the accompanying drawings in which.

Figure 1:
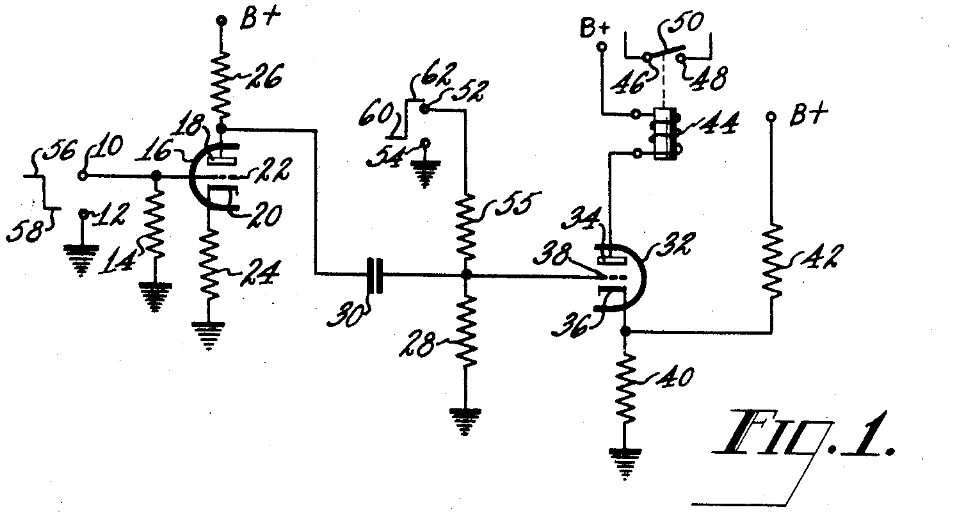
Figure 1 is a schematic diagram of a time delay circuit, in accordance with the present invention.

Referring particularly to Figure 1, there is illustrated a time delay circuit in accordance with the present invention. A voltage output from a frequency modulated V. H. F. receiver, which may, for example, be rectified noise, an automatic gain control voltage or any other voltage which is indicative of the strength of a received carrier signal, is applied to a pair of input terminals 10 and 12 across an input or grid leak resistor 14. The terminal 12 is connected to a point of reference potential, hereinafter referred to as ground. The noise voltage is amplified by an electron discharge device 16 having an anode 18, a cathode 20 and a control grid 22. A grid biasing resistor 24 is connected between the cathode 20 and the ground. The anode 18 is connected to a source of operating potential, designated at B+, through a load resistor 26.

The output voltage from the device 16 is applied across an input resistor 28 through a coupling capacitor 30 to an electron discharge device 32. The device 32 includes an anode 34, a cathode 36 and a control grid 38. A resistor 40 is connected between the cathode 36 and ground. The cathode 36 is also connected to B+ through resistor 42. The anode 34 is connected to B+ through a relay 44 having a pair of contacts 46 and 48 and a movable arm or shorting member 50. A pair of terminals 52 and 54 are also connected to the device 32 through a charging resistor 55.

In considering the operation of the circuit shown, first assume that a normal noise level with no carrier signal applied to the F. M. receiver is at a level 56, as indicated by the waveform at the input terminals 10 and 12. This level 56 is at a relatively high positive potential with respect to ground. During the time that the noise is at this level, the level of the voltage applied to terminals 52 and 54 is at a level 60, as indicated by the waveform at these terminals. The source of the voltage applied to the terminals 52 and 54 is not shown in Figure 1. However, it may be from a multivibrator circuit, such as shown in connection with the devices 102 and 104 in Figure 6, to be herein described. The level 60 is at a relatively low positive potential with respect to ground. Upon reception of a carrier signal by the receiver, the input noise drops to a level 58, indicated by the waveform at terminals 10 and 12. The level 58 is at a relatively low positive potential with respect to ground. At the same instant, the voltage at the terminals 52 and 54 rises to a level 62 as indicated by the waveform. The level 62 is at a relatively high positive potential with respect to ground and during most normal operation, is higher than the voltage at the anode 18. The sudden drop of the noise level may be used to control circuits to trigger a form of multivibrator or other bistable circuit to obtain the instantaneous voltage rise at the terminals 52 and 54, such as indicated by the rise from level 60 to level 62.

The electron discharge device 32 is biased so that it is normally cut-off, or close to cut-off, when no carrier signal is being received by the receiver. The noise is therefore at the relatively high level 56. The voltage applied to the terminals 52 and 54, indicated by the level 60 is normally not sufficient to cause conduction within the discharge device 32. It is seen that with no current, or a very little current, flowing in the device 32 that the relay 44 will remain inoperative or inactuated with its shorting arm 50 separated from the contact 48. The relay 44 may be part of the carrier operated relay device previously referred to. The actuation of the relay 44 causes the arm 50 to short out the contacts 46 and 48. Shorting out of the contacts may be used to affect the operation of various circuits to perform certain desired functions.

When the noise level 56 drops below a certain preset level, such as to level 58, the potential at the anode 18 rises due to the decreased voltage drop across the load resistor 26. At the same time, the potential at the grid 38 starts to rise from close from the level 60 to close to the level 62, the initial rise being limited to some extent by the resistor 55 since, in this case, it is assumed that the voltage level 62 is more positive with respect to ground than the voltage at the anode 18. Resistors 55 and 28 form a voltage divider network so that the voltage at the grid 38 is not exactly equal to the voltage represented by the levels 60 and 62.

In considering the present circuit, it is seen that if the capacitor 30 were not present, the rise of or the step-up of the voltage at the grid 38, would be limited only by the resistor 55, and be sufficient to cause conduction, or increase conduction, in the device 32 almost immediately. The relay 44, therefore, would be actuated almost instantaneously. However, due to the presence of the capacitor 30, the voltage at the grid 38 cannot rise instantaneously because of the relatively low impedance path offered by the capacitor 30 at the instant of the voltage rise to the level 62 at the terminals 52 and 54. It is seen that the voltage at the grid 38 rises in a step to substantially the voltage of the anode 18 and then starts to rise towards a point at which the device 32 will start to conduct, or increase in conduction. The length of delay which occurs before the actuation of the relay 44 depends to a great extent upon the voltage at the anode 18, which represents the amplified noise voltage. The higher the noise level, as represented by the levels 56 and 58, the lower will be the voltage at the anode 18. Consequently, the delay in the rise of voltage at the grid 38 to a predetermined level will be longer with the duration varying directly with the noise level, or inversely in accordance with the strength of an incoming carrier signal.

It is seen that when a sudden rise in voltage is applied to the grid 38 through the terminals 52 and 54 that the voltage starts to charge the capacitor 30 almost immediately. When such a voltage rise or step-up voltage is first applied to the grid 38, the capacitor 30 acts as short circuit at the first instant of the application of the step-up voltage thereby causing the voltage at the grid 38 to rise to substantially the same voltage as the anode 18 in a short step. The capacitor 30 will then start to charge toward the voltage level 62. When the charging voltage across the resistor 28 is high enough to exceed the cut-off potential of the device 32, conduction takes place or increases in the device 32 thereby actuating the relay 44 and its associated circuitry.

When a very strong signal is applied to the receiver, a small noise voltage, as indicated by the level 58, is applied to the amplifying device 16. The voltage at the anode 18 increases. In this case, the initial step-up voltage at the grid 38 is higher. Less time will therefore be required to charge the capacitor 30 to the point to cause conduction or increase conduction within the device 32.

It is thus seen that a time delay in the actuation of the relay 44 takes place. This time delay is substantially inversely proportional to the strength of the received carrier signal, i. e., a low noise level voltage will actuate the relay 44 before a high noise level voltage.

Figure 2:
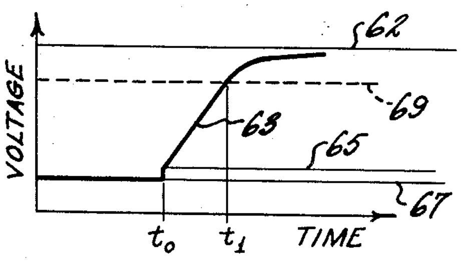
Figures 2 and 3 are curves representing the characteristics of the time delay circuit, in accordance with the present invention.
Figure 3:
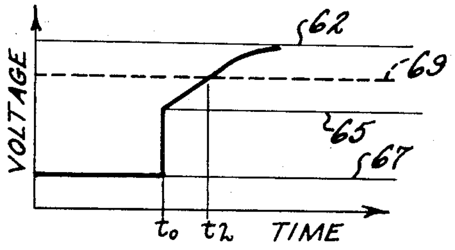

Referring to Figures 2 and 3, in connection with Figure 1, the anode 18 may be considered as the return point for the capacitor 30. When a sudden step-up voltage, as indicated by levels 60 and 62, is applied to the network through the terminals 52 and 54, the capacitor 30 starts to charge. The curve 63 shown in Figure 2 represents the voltage at the grid 38 when a high noise level voltage, i. e., a relatively weak signal, is applied to the input terminals 10 and 12. In this case, the potential at the anode 18, represented by a voltage level 65, is only slightly above the potential of the capacitor 30, represented by the voltage level 67, prior to the switching or application of the carrier signal. When the step-up voltage, such as illustrated by the rise in voltage from level 60 to 62, is applied to the grid 38, the capacitor 30 charges to the potential of the anode 18 in a short step. The capacitor 30 then starts to charge towards the level 62. When the voltage across the capacitor 30 exceeds the cutoff potential of the electron discharge device 32, represented by the voltage level 69 shown in dotted lines, conduction takes place or increases in the device thereby actuating the relay 44. It is seen that the time delay in the actuation of the relay 44 is the time from the application of the step-up voltage, designated as $t_0$, to the time at which the relay 44 is actuated, designated as $t_1$.

When a low noise voltage, i. e., a strong carrier signal, is applied to the network, the potential at the anode 18 is relatively higher, as represented by the voltage level 65 in Figure 3, than the initial voltage across the capacitor 30, as represented by the voltage level 67. When the step-up voltage, represented by the voltage level 62, is simultaneously applied to the network, the initial voltage rise at the grid 38 rises to the voltage level 65 which is the voltage of the anode 18. The capacitor 30 acts, in effect, as short circuit in the first instant that the step-up voltage is applied. The capacitor 30, after the first instant, then charges toward the level 62. Since the initial voltage at the control grid 38 is stepped up to a relatively high voltage level 65, the cutoff potential of the device 32, represented by the voltage level 69, will be reached in a relatively short time. The step-up voltage level 62 is at substantially the same value for all levels of incoming signals. It is seen that the time delay in the actuation of the relay 44 is the difference between $t_0$ and $t_2$ when a relatively strong carrier voltage is applied to the system.

It is thus seen that the present circuit provides a relatively simple and inexpensive network in which a time delay varying inversely in accordance with the strength of an incoming signal is attained.

It is noted that zero time delay is possible when the strength of an incoming signal is above a predetermined level and is sufficient to drive the voltage of the anode 18, represented by the level 65, beyond the cutoff voltage level 69. In this case, the device 32 starts to conduct almost immediately thereby actuating the relay 44.

Since most FM receivers incorporate limiter circuits, it is seen that all signals above a certain level provide substantially the same output voltage for all signals over a certain level. In such a case, a time delay in actuating the relay 44 may not be present when such a relay is used to key a control circuit in a communication system. In many types of equipment, a single circuit for providing zero time delay for signals exceeding a certain value and a real time delay inversely proportional to the strength of a received signal for signals below a certain value is highly useful and desirable.

Figure 4:
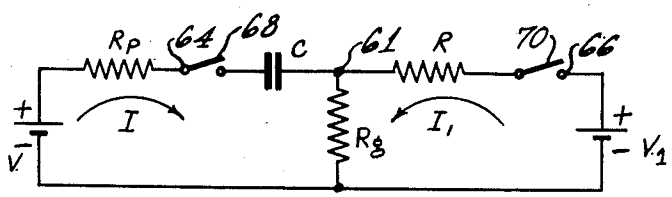
Figure 4 is a simplified or equivalent schematic diagram of a time delay circuit, such as the one shown in Figure 1, in accordance with the present invention.

Referring now to Figure 4, as well as Figure 1, there is shown a simplified schematic equivalent circuit of the time delay circuit illustrated in Figure 1.

The equivalent circuit was drawn with the assumption that the potentials at the anode 18 and at the grid 38 were equal prior to switching.

Let V represent the rise in voltage at the anode 18 when the input noise drops from the level 56 to the level 58, as when an FM receiver is receiving a carrier signal. It is noted that the drop in noise results in an increase in the voltage at the anode 18 due to the phase inversion introduced by the electron discharge device 16.

Let $V_1$ represent the rise in voltage at the terminals 52 and 54. Such a rise or step-up voltage may be from a form of multivibrator or other bistable circuit. $R_p$ represents the plate or anode resistance of the electron discharge device 16. C represents the capacitor 30. $R_g$ represents the grid resistor 28. R represents the charging resistor 55. Assume that the two switches 68 and 70 are closed simultaneously. Closing of the switches simulates the application of the signal voltage and the step-up voltage across the input circuit of the electron discharge device 32.

Normally V is smaller than $$\frac{R_g}{R+R_g}V_1$$

When the two switches 68 and 70 are closed, two transient currents, designated I and $I_1$ flow in the circuit. The value of these two currents may be calculated by the transient techniques.

An example of calculating these currents will be found in the formulas which follow. Other formulas or methods may also be employed to calculate these currents.

If T is the time constant and $t$ represents time, then $$T=R'C$$

where, $$R'=R_p+\frac{RR_g}{R+R_g}$$

and, $$R_0=\frac{RR_g}{R+R_g}$$

and $$V'_1=\frac{R_g}{R+R_g}V_1$$

then, $$I=\frac{V'_1-V}{R'}\epsilon^{-\frac{t}{T}} \quad (1)$$

$$I_1=\frac{V_1}{R+R_g}-\frac{R_g}{R+R_g}\times\frac{V'_1-V}{R'}\epsilon^{-\frac{t}{T}} \quad (2)$$

From the Formulas 1 and 2, the potential at point 61, or at the grid 38, may be calculated by utilizing the following formulas:

$$V_g=V'_1-\frac{R_0}{R'}(V'_1-V)\epsilon^{-\frac{t}{T}} \quad (3)$$

At $t=0$, the potential at point 66 is:

$$V_{g10}=\frac{R_1}{R'}V'_1-\frac{R_0}{R'}V \quad (4)$$

where $V_{g10}$ represents the initial potential rise at the point 61 when $t=0$. It is seen that this rise in potential varies in a linear manner for variations of V.

Consider the time delay between $t=0$ and the moment that the potential at point 61 has risen to a value designated $V_{g12}$, which is the potential required for conduction in the electron discharge device 32 and operation of the relay 44. If this time delay is designated $t_2$, then its value may be attained by solving the following equation:

$$V_{g12}=V'_1-\frac{R_0}{R'}(V'_1-V)\epsilon^{-\frac{t}{t_2}} \quad (5)$$

From this equation, it is seen:

$$t_2=T\left\{\log_\epsilon(V'_1-V)-\log_\epsilon\left(\frac{R'}{R_0}[V'_1-V_{g12}]\right)\right\} \quad (6)$$

$t_2$ is equal to zero when:

$$V\geqq\frac{R_1V'_1-R'V_{g12}}{R_0} \quad (7)$$

When V is equal or greater than the value designated in the Equation 7 it is seen that no time delay is introduced and the relay 44 is instantaneously operated. When V is less than the value designated by the Equation of 7, $t_2$ will be a real value which will vary in accordance with the value of V.

Figure 5:
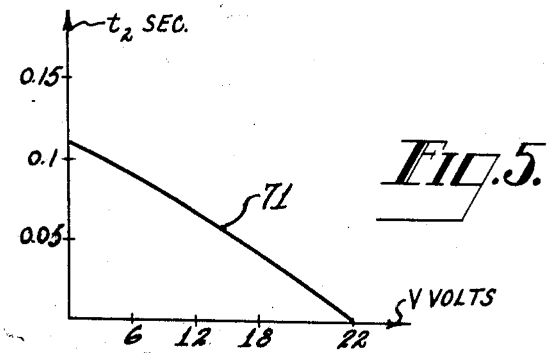
Figure 5 is a curve representing another characteristic of the time delay circuit, in accordance with the present invention.

Referring particularly to Figure 5, there is shown a curve 71. It is seen that as the voltage V, which may be the voltage at the anode 18 shown in Figure 1, is increased, the time delay, designated $t_2$ which occurs between the application of a signal voltage and the actuation of the relay 44, or operation of any form of control circuit, varies inversely with the level of the anode voltage. It is assumed that the step-up voltage applied to the circuit actuating the relay will be at substantially the same values for substantially all levels of input signal voltage.

Figure 6:
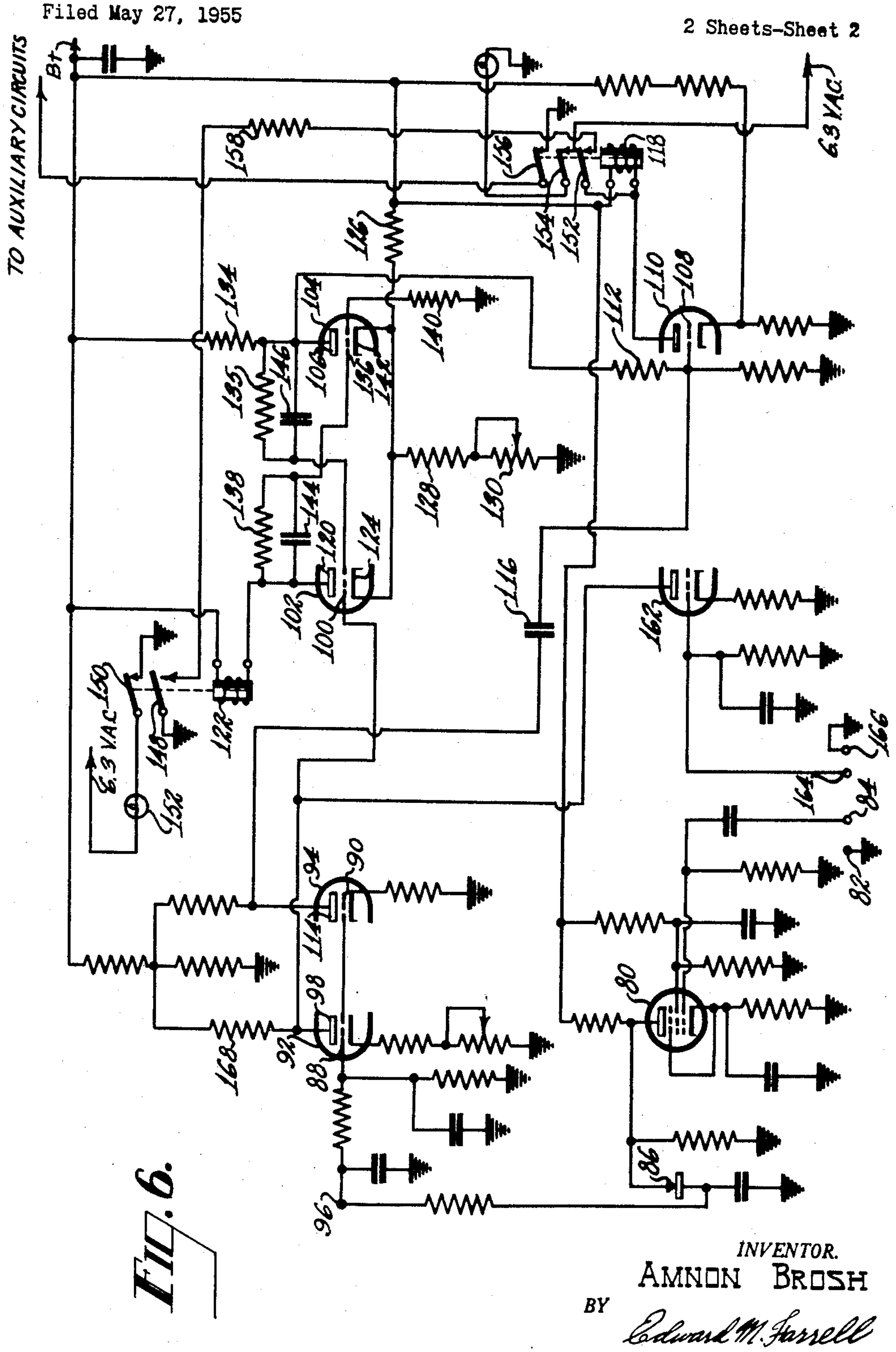
Figure 6 is a schematic diagram of a portion of a receiving circuit and a carrier operated relay embodying the present invention.

Referring particularly to Figure 6, there is shown a specific embodiment of the present invention. A noise voltage, which may be taken from the discriminator circuit of an FM receiver, is applied to a noise amplifier 80 through a pair of terminals 82 and 84. The amplified noise is then rectified by a diode rectifier 86, with the D. C. rectified noise voltage being applied to control grids 88 and 90 of the electron discharge devices 92 and 94, respectively. In some types of receivers rectifying means may be already included. In this case the amplifier 80 and the diode rectifier 86, and their associated circuitry, may be omitted with the rectified noise being applied to the control grids 88 and 90 at point 96. In operation, voltages other than noise voltages may be applied to point 96. For example, in cases where an output voltage is taken from an amplitude modulated, i. e., AM, receiver, the applied voltage may be a D. C. automatic volume control voltage or other voltage which is indicative of the strength of an incoming signal.

The output voltage from the anode 98 is coupled to a control grid 100 of an electron discharge device 102. Electron discharge devices 102 and 104, with their associate circuitry comprises a form of bistable network, as will be described.

The output voltage from the anode 106, which may rise or be stepped up from a relatively low value to a relatively high value is applied to the grid 108 of a control electron discharge device 110 through a resistor 112.

The output voltage from the anode 114 of the electron discharge device 94 is applied to the grid 108 through a capacitor 116. The control electron discharge device 110 is normally non-conducting with no current flowing in the relay 118, which is connected in the plate or anode circuit of the device 110.

In considering the bistable network comprising the electron discharge devices 102 and 104, the device 102 is normally non-conducting with the device 104 normally conducting.

The anode 120 is connected to B+ through a relay 122. The cathode 124 is connected to B+ through a resistor 126, which forms part of a voltage divider network along with resistor 128 and variable resistor 130. The grid 100 is connected to the anode 98 of the device 92. The positive potential at the grid 100 is less than the positive potential at the cathode 124 and is sufficiently low to maintain the device 102 at cutoff.

The device 104 is normally conducting. The anode 106 is connected to B+ through a load resistor 134, which may be considered as part of a voltage divider network including a resistor 135 and the plate or anode circuit of the device 94. The grid 136 is connected to B+ through the resistor 138 and relay 122. Resistor 140 is connected to the grid 136 and forms part of a voltage divider network along with the resistor 138 and the relay 122. The potential at the grid 136 is positive with respect to the cathode 142.

It is seen that since the device 104 is normally conducting heavily that the voltage at the anode 106 is relatively low due to the large voltage drop across the load resistor 134. This is the condition of the bistable network where there is a high noise voltage applied to the device 92. The voltage at the anode 106 is normally not enough to cause conduction in the device 110. At the same time, the output voltage from the anode 98 is not sufficiently high to cause conduction in the device 102 to bring about a change in the operation of the bistable network.

When the input noise voltage applied to the grid 88 is relatively low, such as when a carrier is being received by an FM receiver, the voltage at the anode 98 increases. The increased voltage at the anode 98 is applied to the grid 100 of the normally non-conducting device 102. When the voltage at the anode 98 rises to a certain predetermined level, conduction will result in the device 102. The voltage at the anode 120 then decreases due to the voltage drop across the relay 122, the resistance of which may be in the order of 10,000 ohms. The decrease in voltage at the anode 120 is coupled to the grid 136 through the resistor 138 and a capacitor 144. The current in the device 104 decreases, due to the decreased voltage, thereby causing the voltage at the anode 106 to rise. The rise in voltage at the anode 106 is applied to the grid 100 through the resistor 135 and a capacitor 146. The further rise in voltage at the grid 100 causes greater conduction in the device 102. A cumulative action results in an increase in the conduction within the device 102 and a decrease in the conduction of the device 104. The cumulative action results in an almost instantaneous cutoff of the device 104 and heavy conduction in the device 102. Such instantaneous actions are well known in many types of multivibrator circuits.

It is seen that when the current in the device 104 is almost instantaneously cut off that the voltage at the anode 106 will step up to a relatively high value almost instantaneously. This step-up voltage is applied to the grid 108 of the device 110. The step-up voltage is of the same value regardless of the level of the voltage applied to the grid 100, as long as the voltage is sufficient to cause conduction in the device 102.

It is seen that the same voltage applied to the grid 88 is also applied to the grid 90 of the device 94. A reduction in the noise voltage level from a relatively high value to a relatively low value causes the voltage at the anode 114 to rise. The amount of voltage rise is dependent upon the strength of the signal at the grid 90.

It is seen that an input signal of a predetermined value applied to the grids 88 and 90 will provide an instantaneous rise in the voltage at the anode 114 as well as an instantaneous step-up or rise in the voltage of the output of the bistable network at the anode 106. The step-up voltage at the anode 106, which is applied to the grid 108 through the resistor 112 is generally higher than the value which is necessary to cause conduction in the device 110. However, a time delay in the voltage rise at the grid 108 is introduced as a result of the low impedance path offered by the capacitor 116 at the first instant of application of the step-up voltage.

The operation of this circuit is to a great extent similar to the operation of the circuit described in connection with Figure 1. It is seen that if the capacitor 116 were not present, that the rise or step-up of the voltage at the grid 108 would be limited only by the resistor 112 and be sufficient to cause conduction in the device 110 almost immediately. However, the capacitor 116 offered a relatively low impedance path to the voltage rise at the first instant of its application. The voltage at the grid 108 rises in a step to the voltage of the anode 114 and then rises towards the voltage of the anode 106 as the capacitor 116 charges. The voltage at the grid 108 rises until it reaches a value which overcomes the cutoff potential of the device 110 thereby causing conduction therein. When the current flow in the device 110 is sufficiently high, the relay 118 will be actuated to close its associated contacts.

It is seen that the amount of delay introduced in the actuation of the relay 118 is dependent upon the voltage at the anode 114, which is the voltage to which the grid 108 rises in substantially zero time. The greater the voltage of the anode 114, the shorter will be the time delay in actuating the relay 118. Likewise, the lower the voltage at the anode 114, the longer will be the time delay in actuating the relay 118. Thus the amount of time delay may be made a function of the strength of a signal voltage received. It is therefore seen that despite slight mechanical differences in relay structures, systems may be devised in which a station receiving a stronger signal will have its carrier operated relay operate prior to a station receiving a weaker signal.

It is seen that when the device 102 is conductive that the relay 122 will be actuated to close its associated contacts 148 and 150. Contact 150 is closed to complete a circuit to light a lamp 152. Completion of the electrical circuit may also be employed to operate other devices which may indicate various operations within the system.

It is seen that when the relay 118 is actuated that its associated contacts 152, 154 and 156 will close. Closing of the contact 152 provides an interlock for the relay 118. It is seen that current flows from B+ to the top of the winding of the relay 118, through the winding, from the bottom of the winding through the contact 152, through the resistor 158, through the contact 148 and finally to ground. Variations in circuits prior to the device 110 will therefore not affect the operation of the relay 118 once it is actuated.

Closing of the contact 154 completes a circuit to permit current to flow through an indicating lamp 160 from a source of 6 volts A. C. potential.

Closing of the contact 156 completes a circuit to permit the operation of various devices or auxiliary circuits. Completion of the circuit associated with the contact 156 may be effective to control operation of various multiplexing circuits. It may further provide means for keying a local tone generator to transmit a control signal to various fixed or mobile stations in a communication system. Also, it may provide the means for keying a local V. H. F. transmitter as well as perform numerous other functions. It is obvious that the relay 118 may be provided with numerous additional contacts to control numerous other types of circuits, if desired.

It may be seen that failure of a receiver associated with the circuit shown may result in little or no input noise voltage being applied to the electron discharge devices 102 and 104. Since no input noise voltage results in the same action as a reduction in the noise voltage level, the bistable network will provide a step-up voltage and the control electron discharge device will become conductive to operate the relay 118. Thus, without a form of protective device, control over the system would be maintained by a station having an inoperative receiver. For this reason, a protective device or circuit is employed in the present circuit to prevent this undesirable condition.

An amplifier device 162 provides protective means in the event that the receiver with which the circuit is associated becomes inoperative. An output voltage, which may be from the limiter grid or discriminator plate circuit of a receiver, is applied to the device 162 through the terminals 164 and 166. This voltage is generally negative and is sufficient to provide a bias potential to maintain the amplifier device 162 at cutoff. If one of the circuits prior to the limiter or discriminator becomes inoperative, the bias potential will not be applied to the device 162. Absence of the negative bias potential results in a current flow in the device 162. The current flow in the device 162 causes a voltage drop in a resistor 168, which is the common load resistor for the devices 162 and 92. The voltage at the anode 98 will drop to a relatively low value which is insufficient to operate the bistable network. This value remains relatively low with wide variations in input voltage to the device 92. Thus operation of the relay 118 is prevented unless the receiver, associated with the circuit shown, is operating properly.

In practicing the present invention, numerous other sources of step-up voltage may be employed in the place of the bistable network shown.

It is also noted that the time delay circuit embodying the present invention has been described in connection with highway communication systems. While such systems may benefit greatly from the use of the present invention, it is recognized that the time delay circuit described may find wide application in numerous types of general electrical circuits wherein it is desired to introduce a time delay.

What is claimed is:

1. In combination with a relay adapted to be operated by a predetermined voltage applied to an input circuit, a time delay circuit for delaying the operation of said relay in accordance with the strength of a signal voltage comprising means including said signal voltage for providing a variable output voltage normally lower than said predetermined voltage, a bistable circuit having two relatively fixed voltage levels, means including said signal voltage for triggering said bistable circuit to provide a step-up voltage when said signal voltage exceeds a predetermined level, said step-up voltage being higher than said predetermined voltage, capacitive means, means for applying said variable output voltage to said input circuit through said capacitive means, and means for applying said step-up voltage to said input circuit whereby the voltage at said input circuit rises to reach said predetermined voltage after a time delay dependent upon the level of said variable output voltage.

2. A time delay circuit comprising a relay adapted to be operated by a voltage of a predetermined level applied to an input circuit, a source of reference voltage variable in accordance with the strength of a carrier signal, said reference voltage being lower than the voltage necessary to operate said relay, a bistable circuit, said bistable circuit normally providing a relatively low output voltage and adapted to be triggered by said reference voltage to provide a step-up voltage when said carrier signal exceeds a predetermined value, said step-up voltage exceeding the predetermined level of voltage necessary to operate said relay, capacitive means, means for applying said reference voltage to said input circuit through said capacitive means, and means for applying said step-up voltage to said input circuit, said step-up voltage and said reference voltage being applied across said capacitive means, said capacitive means providing in effect a relatively low impedance path for said step-up voltage when said step-up voltage exceeds said reference voltage at the first instant of the application of said step-up voltage to said control device, said impedance path effectively increasing as said capacitive means charges towards the level of said step-up voltage whereby a time delay in the operation of said control device is effected, said time delay varying in accordance with the strength of said carrier signal.

3. The invention as set forth in claim 2 wherein instantaneous operation of said relay is effected when said reference voltage exceeds the predetermined voltage necessary to operate said relay.

4. The invention as set forth in claim 3 wherein said relay is included in the spaced current path of an electron discharge device.

5. A time delay circuit comprising first and second input amplifiers, means for applying a signal voltage representative of a carrier signal to said amplifiers, a bistable circuit, means for applying the output voltage from said first amplifier to trigger said bistable circuit to produce a step-up voltage when said carrier signal exceeds a predetermined level, an electron discharge device, a relay serially connected in the space current path of said electron discharge device, said relay being normally inoperative and becoming operative when a predetermined current flows through said electron discharge device, capacitive means, means for applying the output voltage from said second amplifier to said electron discharge device through said capacitive means, and means for applying said step-up voltage from said bistable circuit to said electron discharge device, said output voltage from said second amplifier and said step-up voltage being applied across said capacitive means to cause the voltage at said electron discharge device to rise instantaneously to the output voltage of said second amplifier and to further rise exponentially towards said step-up voltage to increase the current in said electron discharge device to operate said relay when said output voltage at said electron discharge device exceeds a predetermined level.

6. A time delay circuit comprising first and second input amplifiers, means for applying a noise voltage inversely proportional to the strength of a carrier signal to said amplifiers, a bistable circuit, means for applying the output voltage from said first amplifier to trigger said bistable circuit to produce a step-up voltage when said carrier signal exceeds a predetermined level, a control electron discharge device, a relay serially connected in the space current path of said control electron discharge device, said relay being normally unactuated and adapted to be actuated by a predetermined voltage applied to said electron discharge device, capacitive means, means for applying the output voltage from said second amplifier to said control electron discharge device through said capacitive means, said output voltage from said second amplifier being lower than said predetermined voltage, means for applying said step-up voltage from said bistable circuit to said control electron discharge device, said step-up voltage being normally higher than the output voltage from said second amplifier and said predetermined voltage, the voltage at said control electron discharge device rising instantaneously to the output voltage level of said second amplifier and continuing to rise exponentially towards the voltage level of said step-up voltage from said bistable circuit to cause conduction in said control electron discharge device after a time delay dependent upon the level of the voltage from said second amplifier.

7. A time delay circuit comprising first and second input amplifiers, means for applying a noise voltage inversely proportional to the level of a carrier signal to said amplifiers, a bistable circuit adapted to produce a step-up voltage when said carrier signal exceeds a predetermined level, said step-up voltage being of a relatively fixed level for different values of said noise voltage, an electron discharge device normally non-conducting, a relay serially connected in the space current path of said electron discharge device, said relay being inoperative when said electron discharge device is nonconducting, capacitive means, means for applying the output voltage from said second amplifier to said electron discharge device through said capacitive means, and means for applying said step-up voltage from said bistable circuit to said electron discharge device, said step-up voltage being normally higher than the output voltage from said second amplifier, said step-up voltage further being sufficient to cause conduction in said electron discharge device, the voltage at said electron discharge device rising from the output voltage of said second amplifier towards the level of said step-up voltage from said bistable circuit whereby said electron discharge device becomes conductive to operate said relay after a time delay variable in accordance with said noise voltage.

8. A time delay network comprising an electron discharge device, a relay connected in the current path of said electron discharge device, means for biasing said electron discharge device to render said relay inoperative until a predetermined control voltage is applied to said electron discharge device, a source of voltage lower than said predetermined voltage variable in accordance with an incoming carrier signal, a bistable circuit providing a step-up voltage higher than said predetermined voltage when said carrier signal exceeds a predetermined level, a charging circuit connected to the input circuit of said electron discharge device, means for applying said source of variable voltage through said charging circuit to said electron discharge device, and means for applying said step-up voltage to said charging circuit, said variable voltage providing a starting voltage level for said charging circuit, said step-up voltage providing a voltage level towards which said charging circuit charges whereby said relay becomes operative when said charging circuit charges to a voltage exceeding said predetermined control voltage.

References Cited in the file of this patent

UNITED STATES PATENTS

| | | |
|---|---|---|
| 2,552,103 | Orpin | May 8, 1951 |
| 2,559,959 | Hipps | July 10, 1951 |
| 2,811,708 | Byrnes | Oct. 29, 1957 |